United States Patent [19]

Cabral

[11] Patent Number: 5,033,264
[45] Date of Patent: Jul. 23, 1991

[54] COMPACT COGENERATION SYSTEM
[75] Inventor: Richard E. Cabral, Tewksbury, Mass.
[73] Assignee: Tecogen Inc., Waltham, Mass.
[21] Appl. No.: 367,383
[22] Filed: Jun. 16, 1989
[51] Int. Cl.$^5$ ............................................. F01N 3/20
[52] U.S. Cl. ........................................ 60/274; 60/298; 60/301; 60/320; 422/171; 422/172; 422/173
[58] Field of Search ................ 60/274, 298, 301, 320, 60/321; 422/171–173

[56] References Cited

U.S. PATENT DOCUMENTS 3,041,149 6/1962 Houdry .............................. 422/173

FOREIGN PATENT DOCUMENTS 2904700 8/1980 Fed. Rep. of Germany ........ 60/320
345 1/1982 Japan ..................................... 60/298
5422 1/1983 Japan ..................................... 60/298
34413 2/1984 Japan ..................................... 60/320
90915 5/1985 Japan ..................................... 60/298

Primary Examiner—Douglas Hart
Attorney, Agent, or Firm—Lorusso & Loud

[57] ABSTRACT

A compact cogeneration system in which a catalytic converter is positioned within otherwise unused space in an exhaust gas heat exchanger employed to heat water. Exhaust gases from an internal combustion engine of a packaged cogeneration system are directed through a single- or two-stage catalytic converter in a central cylindrical housing of the heat exchanger, then are diverted to pass in counterflow over a water-containing coil in an annulus surrounding the housing.

6 Claims, 3 Drawing Sheets

COMPACT COGENERATION SYSTEM

BACKGROUND OF THE INVENTION

The present invention relates generally to cogeneration systems, and specifically to an improved cogeneration system having an exhaust heat exchanger with an integral catalytic converter element.

Cogeneration is an energy-production process involving the simultaneous generation of thermal (e.g. process steam) and electrical energy by using a single primary heat source. It can be employed whenever there is a need for the two energy forms and whenever on-site electric power generation is justified or when thermal-energy users are in close proximity to an electric power generation site. For example, packaged natural gas fueled cogeneration systems are available from Tecogen, Inc. of Waltham, Massachusetts, assignee of the present invention, in several different output ratings (e.g., 60 KW of electrical power, 440,000 BTU/hr thermal output as hot water). Such cogeneration systems are often used by hospitals, health clubs having large heated swimming pools, greenhouses, schools and light industry.

Fuel saving is a major incentive for use of cogeneration. Since all heat-engine-based electric power systems exhaust heat to the environment, the exhausted heat can frequently be used to meet all or part of the on-site or local thermal energy needs. Use of the exhausted heat does not normally affect the amount of primary fuel used, yet it can lead to a saving in all or part of the fuel that would otherwise be used for the thermal-energy process.

The cogeneration system toward which the present invention is directed utilizes a fossil fuel burning internal combustion engine in which exhaust gas is directed through a heat exchanger to heat water for use as "hot water". This exhaust gas is generally at 1000°-2500° F. entering the heat exchanger, and in passing through the heat exchanger heats water circulating through a coil whose external surfaces are contacted by the exhaust gas. Before the exhaust gas can be discharged into the atmosphere, it may require a treatment in a catalytic converter which heretofore has been provided as a separate unit upstream of the heat exchanger. The converter may typically contains a noble metal catalyst, a material which promotes the reduction of $NO_x$ and conversion of the carbon monoxide and hydrocarbons which result from partly burned or unburned fuel to carbon dioxide and water vapor. The exhaust gas is thus sufficiently clean for discharge into the atmosphere.

A principal disadvantage of known cogeneration systems with catalytic converters is that the systems are large and bulky, requiring considerable space and external plumbing of their separate, interconnected components. The cost of such cogeneration systems accordingly may be higher than desired. A decrease in size of the system would reduce costs and result in a cogeneration system which could fit the space requirements of a larger number of potential users.

Accordingly it is a principal object of the present invention to provide a cogeneration system having a catalytic converter and which is compact and space efficient.

It is a particular object of the invention to provide a single or multi-stage catalytic converter arranged within the housing of an exhaust gas heat exchanger of a packaged cogeneration system.

Another object of the present invention is to provide a cogeneration system that can be economically produced and thus available to a wide range of users.

These and other objects and advantages of the present invention will be evident from the description which follows.

SUMMARY OF THE INVENTION

The present invention is a compact cogeneration system having a catalytic converter integral with an exhaust gas heat exchanger. The system eliminates cumbersome separately-coupled elements by incorporating a catalytic converter within the unused space in the exhaust gas heat exchanger. The catalytic converter material, instead of being provided in a separate element, is positioned as a single-stage or two-stage arrangement within a central housing in the heat exchanger. Gas flows within the heat exchanger are directed so as to pass exhaust gases from the engine first through the central housing containing the catalytic converter, then in counterflow over a coil containing water to be heated. The savings in space, exhaust plumbing, insulation blankets and heater packaging are substantial.

The invention will be better understood with reference to the following detailed description of preferred embodiments of the invention, taken together with the attached drawing, in which like reference numbers represent like elements throughout the various figures.

DETAILED DESCRIPTION OF THE PREFERRED EMBODIMENTS

Figure 1:
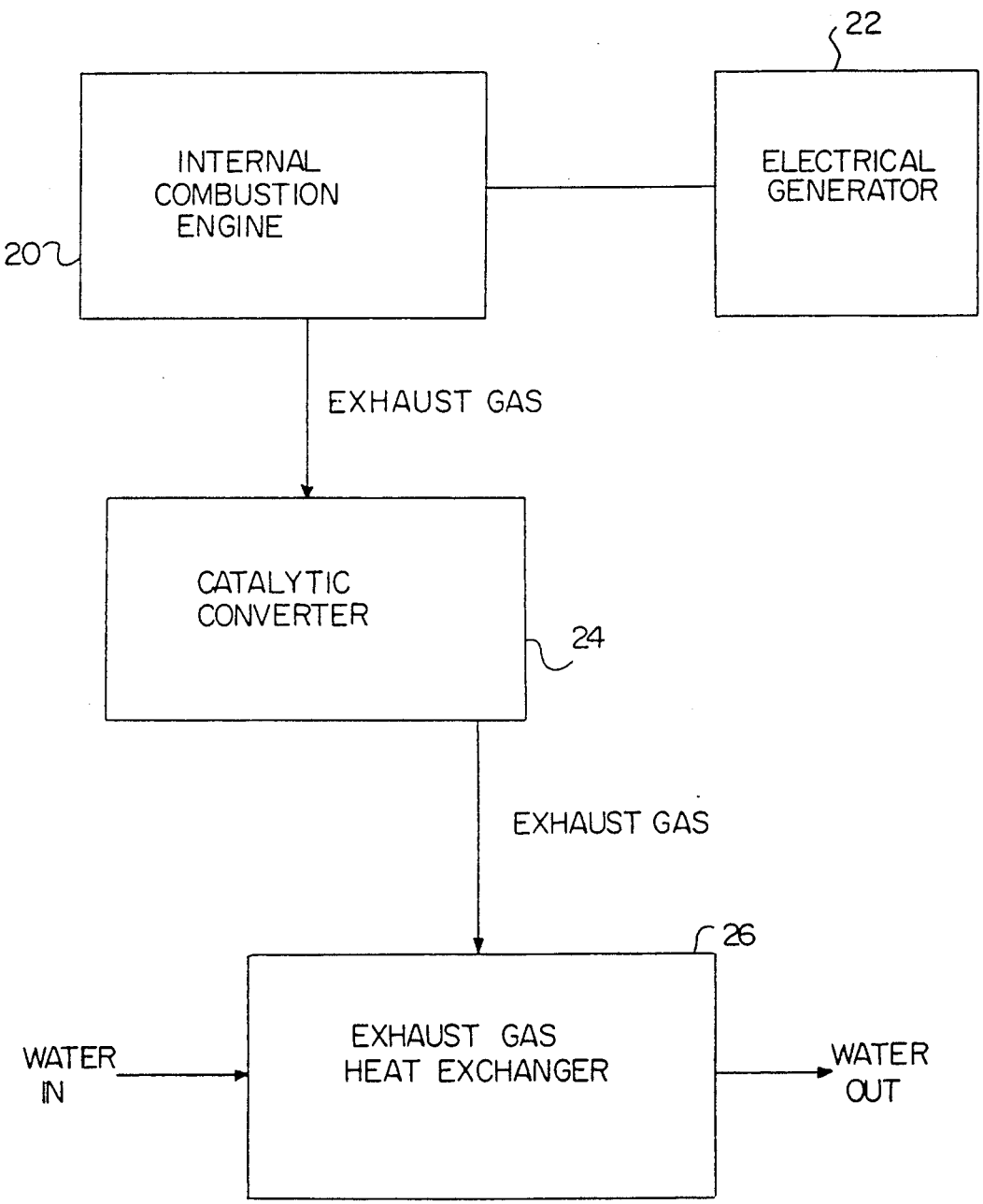
FIG. 1 is a schematic diagram of a prior art cogeneration system.

A prior art cogeneration system with a catalytic converter is shown in schematic form in FIG. 1. The cogeneration system includes an internal combustion engine 20 which powers an electrical generator 22 such as an induction generator and produces exhaust gas. The exhaust gas from the engine 20 travels first through a catalytic converter 24, where harmful components of the exhaust gas are eliminated or reduced. The clean gases then flow to an exhaust gas heat exchanger 26, which is separate from and connected in series with the catalytic converter 24. Included in the heat exchanger are one or more coils (not shown) through which water is directed to absorb heat from the exhaust gas as the gas passes over the coils, producing hot water for use as desired. The cooled exhaust gas then leaves the heat exchanger 26 and is expelled to the environment.

Figure 2:
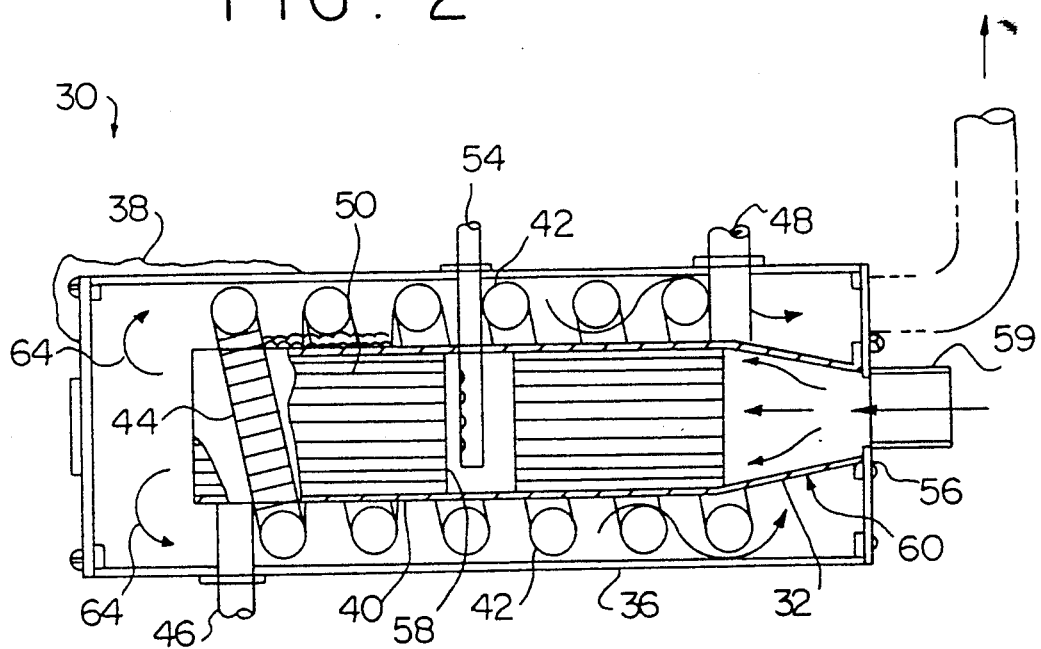
FIG. 2 is a cross-sectional view of one embodiment of the exhaust gas heat exchanger of a cogeneration system of the present invention.

FIG. 2 is a cross-sectional view of an exhaust gas heat exchanger 30 of a cogeneration system according to the present invention and which contains an integral catalytic converter 32. The heat exchanger 30 includes an outer shell 36, preferably formed of stainless steel, and some or all of whose outer surface may be Covered by insulation 38. A housing 40, preferably cylindrical, is mounted within and spaced from the outer shell 36 and is surrounded by a water coil 42 which may have externally-mounted, or integral, fins 44 as extended heat transfer surfaces, and through which water is circulated from an inlet 46 to an outlet 48. The interior of the housing 40 is packed with catalytic converter material 50 such as honeycomb ceramic plated with a catalyst such as platinum. This material may be similar to that used in catalytic converters employed in automobile exhaust systems. A preferred material is $NO_x$ reduction catalyst Part No. 41013001 which may be obtained from Engelhard Corporation of Edison, New Jersey. The honeycomb material may be wrapped in a mesh screen to retain it in the housing 40.

The heat exchanger 30 illustrated in FIG. 2 includes a two-stage catalytic converter, with air injection through an injector tube 54 between the first stage 56 and the second stage 58 to be used in applications where low emissions of both $NO_x$ and CO are required. Air injection, combined with the catalytic material of the second stage 58, coverts carbon monoxide produced in the first stage into carbon dioxide. As a result, the gases exiting the second stage 58 have low levels of $NO_x$ and CO. The integral catalytic converter/heat exchanger configuration is particularly significant in reducing overall length of packaged cogeneration systems.

Figure 3:
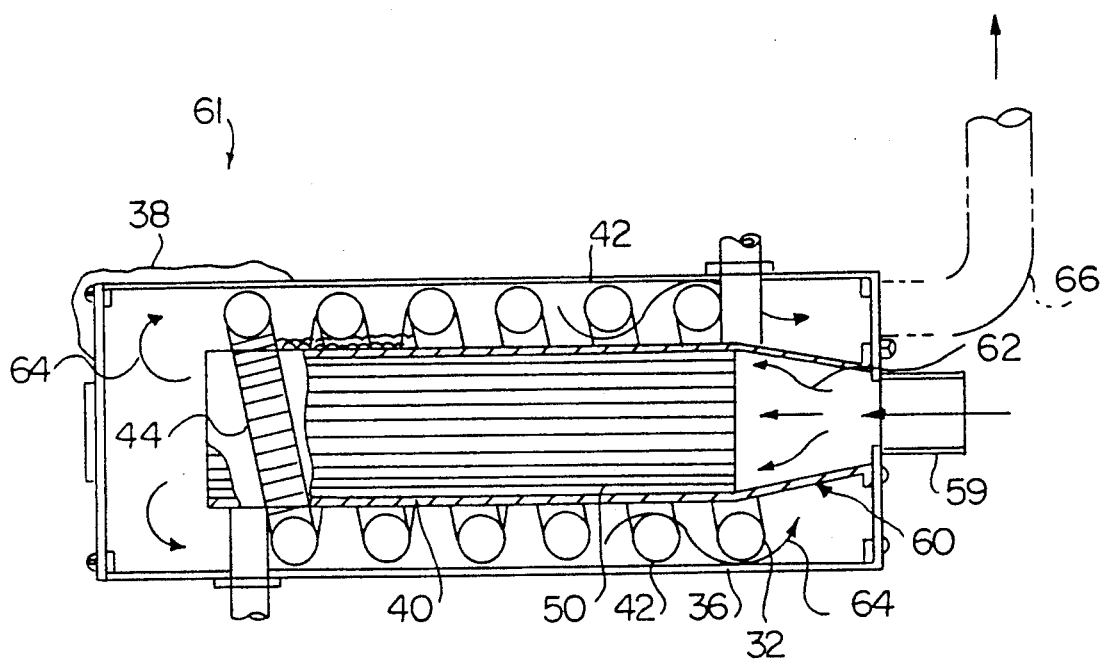
FIG. 3 is a cross-sectional view of another embodiment of the exhaust gas heat exchanger of the cogeneration system of the present invention.

FIG. 3 illustrates an exhaust gas heat exchanger 61 with an integral single-stage catalytic converter 32. The exhaust gas heat exchanger 61 is identical to the two-stage heat exchanger 30 except that the air injection tube 54 and the second stage 58 of the catalytic converter 32 of the embodiment of FIG. 2 are not required. The heat exchanger 61 may be utilized where low emissions of carbon monoxide are not required, at a resulting reduction in cost and complexity.

In operation of the exhaust gas heat exchanger 30 of a cogeneration system as illustrated in FIG. 2, exhaust gas from the internal combustion engine (not shown), typically having a temperature of between 1000° F. to 2500° F., flows through an inlet 59 and transition duct 60 into the catalytic converter 32 within the housing 40 of the heat exchanger 30, as shown by the arrows 62 of FIG. 2. The exhaust gas travels through the catalytic converter material 18 which removes harmful gases. The exhaust gas exiting the catalytic converter 32 then reverses direction and, as shown by the arrows 64, travels through the annulus between the housing 40 and the outer shell 36 around the water-containing coil 42 to raise the water temperature. The exhaust gas then leaves the heat exchanger 30 through an outlet 66, typically at a temperature of about 250° F., and heated water exiting the coil 42 may be used for any desired purpose.

Variations and modifications of the embodiments described will be apparent to those skilled in the art without departing from the spirit and scope of the invention. Accordingly, only such limitations should be imposed on the invention as are set forth in the appended claims.

What is claimed is:

1. A compact heat exchanger for heating water with, and cleaning, the exhaust gas of an internal combustion engine of a cogeneration system comprising:
   an outer shell having
   gas inlet means for entry of exhaust gas from said engine,
   gas outlet means for outflow of exhaust gas,
   water inlet means for entry of water to be heated, and
   water outlet means for outflow of water;
   a housing positioned within and spaced from said outer shell to form a flow channel therebetween;
   a coil in communication with said water inlet means and said water outlet means and positioned in said flow channel between said housing and said outer shell;
   catalytic converter material within said housing;
   wherein said housing is connected to said gas inlet means to receive exhaust gas from said engine and to direct said exhaust gas through the catalytic converter material.

2. The compact heat exchanger of claim 1 wherein an end of said housing opposite said gas inlet means defines an outlet for exit of exhaust gas from said housing, and said compact heat exchanger further includes means for directing exhaust gas received from said housing in counterflow through said flow channel.

3. The compact heat exchanger of claim 1 wherein said catalytic converter material comprises a first stage and a second stage in spaced-apart, series arrangement within said housing, and further comprising means for injecting air into a gap formed between said stages.

4. A method for heating water with, and cleaning, the exhaust gas of an internal combustion engine of a cogeneration system comprising:
   providing an apparatus including
   a container having gas inlet means for entry of exhaust gas from said engine, gas outlet means for outflow of exhaust gas from said container, water inlet means for entry of water into said container, and water outlet means for outflow of water from the apparatus
   a housing positioned within said container;
   a coil within said container in communication with said water inlet means and said water outlet means and surrounding said housing; and
   catalytic converter material within said housing;
   adding water to be heated in said apparatus through said water inlet means to said coil;
   passing said exhaust gas through said gas inlet means;
   passing the exhaust gas through the catalytic converter material;
   passing the exhaust gas into contact with external surfaces of the coil whereby the water in the coil is heated by the exhaust gas; and
   passing the heated water through the water outlet means.

5. The method of claim 6 wherein said step of passing the exhaust gas into contact with external surfaces of the coil includes diverting the outflow of exhaust gas from said catalytic converter material to pass in counterflow to the flow of exhaust gas through said catalytic converter material.

6. The method of claim 7 wherein said step of passing the exhaust gas through the catalytic converter material comprises passing the exhaust gas through a first stage of catalytic converter material and then passing injected air and the exhaust gas through a second stage of catalytic converter material.

* * * * *